United States Patent
Abe et al.

(10) Patent No.: US 8,264,117 B2
(45) Date of Patent: Sep. 11, 2012

(54) MOTOR AND ELECTRONIC APPARATUS USING THE SAME

(75) Inventors: Kyo Abe, Tottori (JP); Okihisa Tsuchie, Shimane (JP); Hiroshi Kawai, Shimane (JP)

(73) Assignee: Panasonic Corporation, Osaka (JP)

( * ) Notice: Subject to any disclaimer, the term of this patent is extended or adjusted under 35 U.S.C. 154(b) by 207 days.

(21) Appl. No.: 12/677,634

(22) PCT Filed: Apr. 3, 2008

(86) PCT No.: PCT/JP2008/000856
§ 371 (c)(1),
(2), (4) Date: Mar. 11, 2010

(87) PCT Pub. No.: WO2009/063575
PCT Pub. Date: May 22, 2009

(65) Prior Publication Data
US 2010/0219714 A1    Sep. 2, 2010

(30) Foreign Application Priority Data
Nov. 15, 2007   (JP) .................... 2007-296525

(51) Int. Cl.
*H02K 1/18* (2006.01)
*H02K 15/02* (2006.01)
(52) U.S. Cl. .................. 310/216.048; 29/596
(58) Field of Classification Search .............. 310/67 R, 310/216.048
See application file for complete search history.

(56) References Cited

U.S. PATENT DOCUMENTS

| | | | | | |
|---|---|---|---|---|---|
| 5,142,178 A | * | 8/1992 | Kloster et al. | ......... | 310/216.048 |
| 5,338,996 A | * | 8/1994 | Yamamoto | ............. | 310/216.048 |
| 5,448,119 A | * | 9/1995 | Kono et al. | .................. | 310/67 R |
| 2002/0047459 A1 | * | 4/2002 | Adaeda et al. | ................ | 310/216 |
| 2007/0182268 A1 | | 8/2007 | Hashiba et al. | | |

FOREIGN PATENT DOCUMENTS

| | | | |
|---|---|---|---|
| JP | 05-122875 A | 5/1993 |
| JP | 07-170699 A | 7/1995 |
| JP | 08-214477 A | 8/1996 |
| JP | 11-299133 A | 10/1999 |
| JP | 11-299133 A | 10/1999 |
| JP | 2005-130571 A | 5/2005 |
| JP | 2007-215282 A | 8/2007 |
| JP | 2007-252076 A | 9/2007 |

OTHER PUBLICATIONS

International Search Report for Application No. PCT/JP/2008/000856, Jul. 1, 2008.

\* cited by examiner

*Primary Examiner* — Burton Mullins
(74) *Attorney, Agent, or Firm* — RatnerPrestia

(57) ABSTRACT

A stator core comprises a laminated part made by stacking a plurality of sheet-like plates and one sheet-like plate into an integral unit in a manner to form dimple portions on both surfaces in the stacking direction thereof, and side plates each having extended portions and nib portions formed on a surface opposite the side where the extended portions are provided and disposed in a manner to sandwich the both surfaces of the laminated part, wherein the laminated part and the side plates are fastened together by inserting the nib portions on the side plates into the dimple portions formed on the laminated part.

24 Claims, 9 Drawing Sheets

MOTOR AND ELECTRONIC APPARATUS USING THE SAME

This application is a U.S. National Phase Application of PCT International Application PCT/JP2008/000856.

TECHNICAL FIELD

The present invention relates to motors and electronic apparatuses using the motors.

BACKGROUND ART

An electronic apparatus such as a laser printer has a paper feed roller (i.e., driven unit) coupled with a motor and disposed inside a main unit casing, and this motor drives the paper feed roller to rotate and deliver paper to a predetermined position.

The above motor comprises a stator including a stator core having a plurality of magnetic poles disposed at first predetermined intervals along the outer periphery thereof, and a rotor disposed around the outer periphery of the stator. The rotor has a structure comprising magnets disposed at second predetermined intervals along the inner periphery thereof with their poles magnetized alternately to have different polarities.

The stator core is provided with an extended portion formed on each of the magnetic poles in a manner to extend from the base of the magnetic pole into a direction generally parallel to the magnet for improvement of a driving efficiency.

That is, the magnets are made larger in width (i.e., the width in a direction orthogonal to the circumferential direction) than a width at the base of the magnetic poles of the stator core in the same direction in order to bring the magnets as close as possible to a magnetic sensing element for magnetically sensing rotation of the rotor. It is for this reason that the conventional motor comprises the extended portions called end plates extended from the base of the magnetic poles of the stator core into the direction generally parallel to the magnets. These extended portions increase confronting areas between the magnetic poles of the stator core and the magnets to attain a high driving efficiency.

There are some techniques known to compose the stator core, of which one example is to stack a plurality of sheet-like plates each having nibs and dimples, and integrate them into one unit by swaging the nibs and the dimples between layers of the stacked plates. Also disclosed is a technique designed to improve a fastening strength among side plates having extended portions on both sides and inner plates between the side plates by means of connecting holes formed to extend through a laminated part in a direction of the rotational axis and bent tabs provided on the side plates, wherein the bent tabs are fitted into the connecting holes to fasten together the side plates and the laminated part. Such a technique is disclosed in patent literature 1, for example.

In the process of forming the magnetic poles having the extended portions, the fastening strength can be increased among the side plates and the inner plates, as described above, by fitting the bent tabs provided on the side plates into the connecting holes formed in the laminated part.

However, the magnetic poles discussed above have the structure designed to use the bent tabs provided on the side plates to fasten them to the laminated part. The bent tabs are therefore prone to troubles such as becoming broken and deformed in the processes of fabrication and transportation. There is also another problem attributed to pointed ends of the bent tabs, which make handling of the side plates difficult. In addition, the above structure is likely to lower the manufacturing efficiency due to its use of two different fastening methods, i.e., the nib-and-dimple swaging of the sheet-like plates to form the laminated part, and the press-fitting by using the bent tabs to fasten the laminated part and the side plates.

Patent Literature 1: Japanese Patent Unexamined Publication, No. 2007-215282

SUMMARY OF THE INVENTION

A motor of the present invention comprises a stator including a stator core having a plurality of magnetic poles disposed along an outer periphery thereof, and a rotor disposed rotatably around the outer periphery of the stator. The rotor comprises a magnet disposed to an inner periphery thereof with its poles magnetized alternately to have different polarities at predetermined intervals. Each of the magnetic poles is provided with an extended portion formed in a manner to extend outward from both exterior sides of a magnetic polar base in a direction substantially parallel to the magnet. The stator core comprises a laminated part made by stacking a plurality of sheet-like plates into an integral unit in a manner to form dimple portions on both surfaces in the stacking direction thereof, and side plates each having an extended portion and nib portions formed on a surface opposite the side where the extended portion is provided and disposed in a manner to sandwich the both surfaces of the laminated part, wherein the laminated part and the side plates are fastened together by inserting the nib portions on the side plates into the dimple portions formed on the laminated part.

Since the above structure needs to have only the nib portions of a shape suitable for nib-and-dimple swaging on the side plates, it can avoid troubles such as getting broken and deformed. In addition, this structure can make good use of the nib-and-dimple swaging of the side plates together with the individual sheet-like plates composing the laminated part since these plates can be fastened simply by swaging them in a manner to insert the nib portions of the side plates into the dimple portions on the both surfaces of the laminated part. Furthermore, this structure can keep the side plates free from the troubles of becoming broken and deformed since it has only the nib portions of the shape designed for the nib-and-dimple swaging on the side plates. Accordingly, the present invention can provide the motor comprising the stator core having the extended portions that helps achieve improvement of the quality and efficiency in the manufacturing process.

REFERENCE MARKS IN THE DRAWINGS

Figure 1:
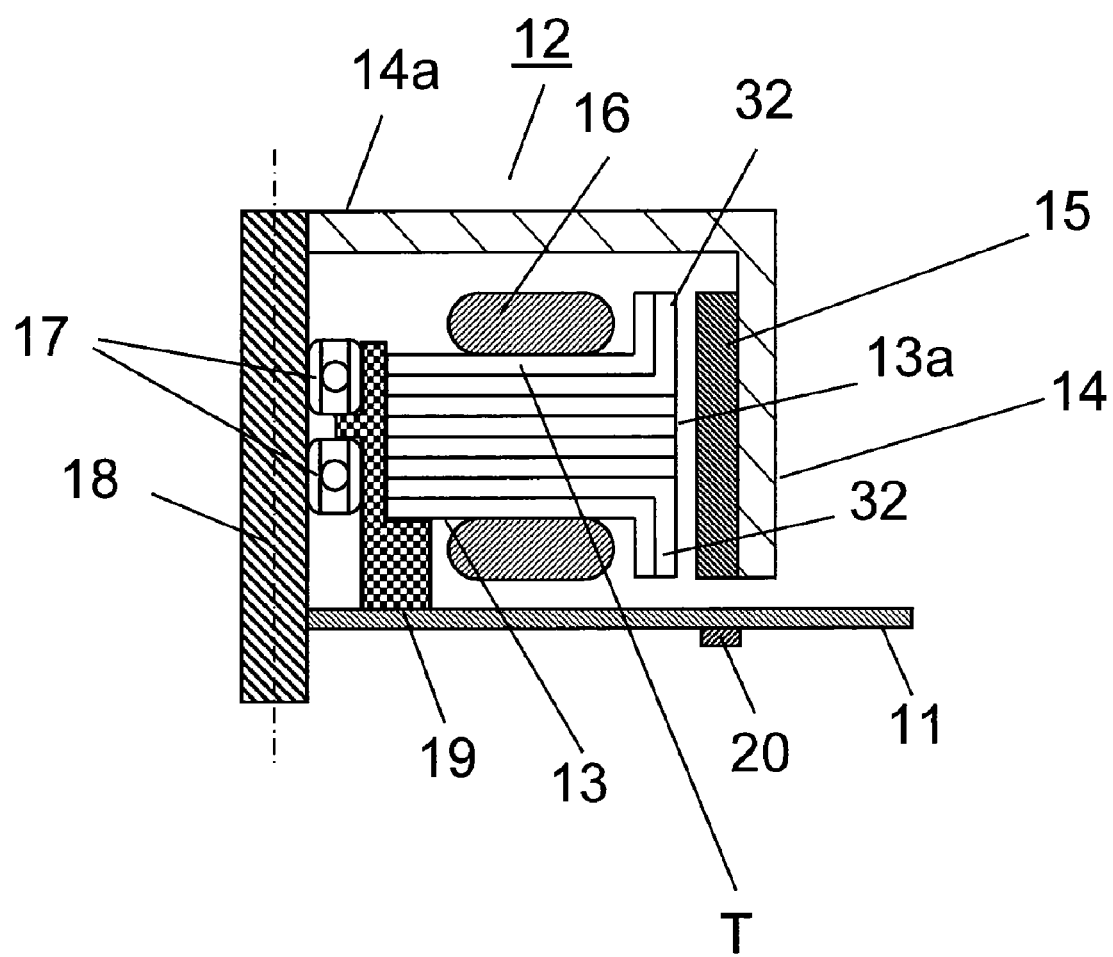
FIG. 1 is a sectional view of a motor according to a first exemplary embodiment of the present invention.

11 Wiring board
12 Motor
13, 43 Stator core
13a Tooth
14 Rotor
14a Top plate
15 Magnet
16 Coil
17 Bearing
18 Drive shaft
19 Housing
20 Hall IC
32 Extended portion
33 Magnetic polar base
34, 36, 46, 47 Fastening portion
35 Fastening portion between laminated part and side plate
320, 420 Side plate
321, 331, 332, 421, 431, 432 Sheet-like plate
321a, 331a, 421a, 431a Nib-and-dimple combination
330, 430 Laminated part
330a, 332a, 432a, 431b Hole
471 Through hole

DETAILED DESCRIPTION OF PREFERRED EMBODIMENTS

Description will be provided hereinafter of exemplary embodiments of the present invention with reference to the accompanying drawings.

First Exemplary Embodiment

In this exemplary embodiment, description is provided of a typical motor used for feeding paper and built into a laser printer as an example of electronic apparatus. The motor of this exemplary embodiment is mounted with various other electronic components on a wiring board which is disposed horizontally inside a main unit casing (not shown) of the laser printer.

Figure 2:
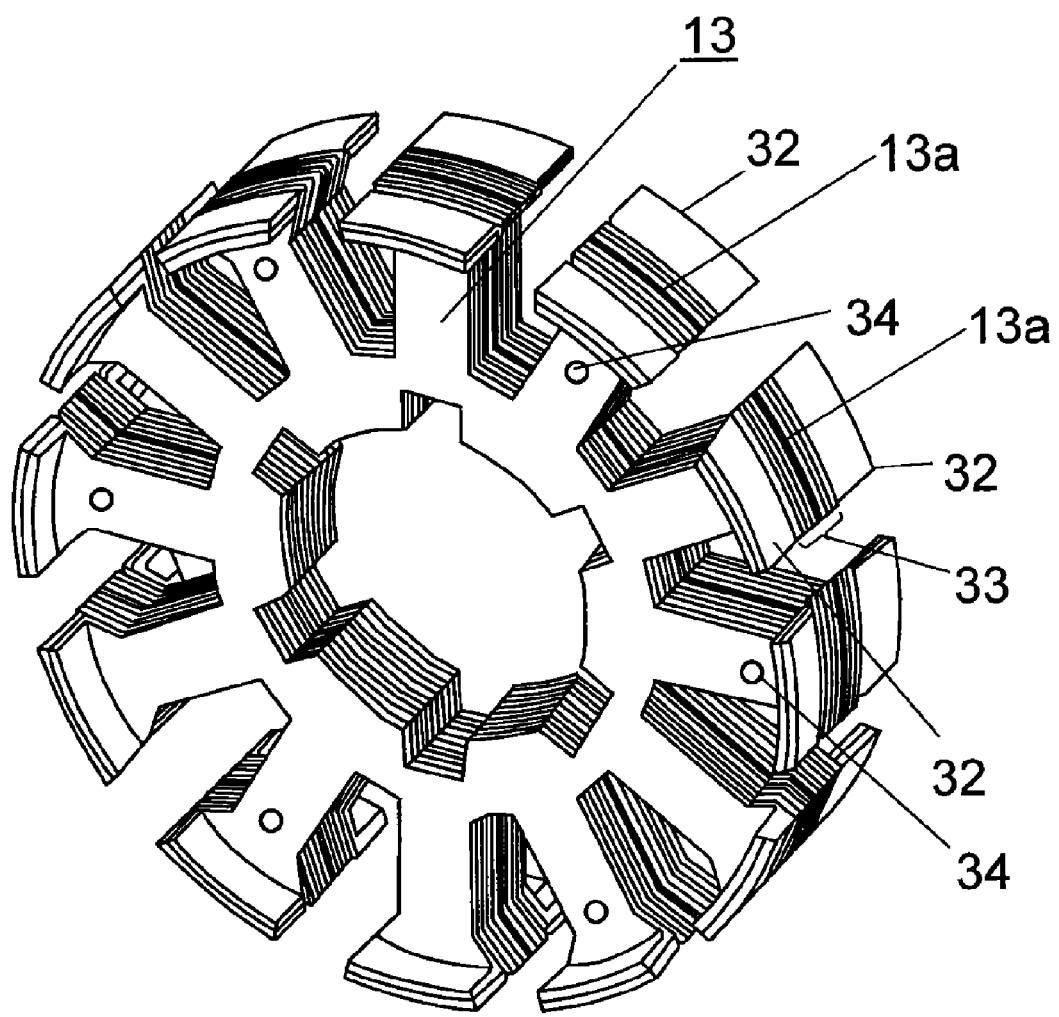
FIG. 2 is a perspective view of a stator core of the motor.

FIG. 1 is a sectional view of the motor according to the first exemplary embodiment of the present invention, and FIG. 2 is a perspective view showing a stator core of the motor of this exemplary embodiment. Referring now to FIG. 1 and FIG. 2, description is provided first of an overall structure of this motor.

As shown in FIG. 1, motor 12 of this exemplary embodiment comprises a stator including stator core 13 mounted on wiring board 11 with a mounting fixture, and rotor 14 of a cylindrical shape having an opening in the bottom and disposed rotatably around the outer periphery of stator core 13. Rotor 14 comprises magnet 15 of an annular shape fixed to an inner periphery thereof, wherein magnet 15 has N- and S-poles magnetized alternately (i.e., different polarities next to one another) at regular intervals. Stator core 13 has a laminated structure made by stacking a plurality of sheet-like plates into an integral unit. Stator core 13 comprises a plurality of teeth 13a serving as magnetic poles disposed at predetermined intervals in the circumferential direction along an outer periphery thereof as shown in FIG. 2. Each of arm portions T constituting magnetic circuits at the inner side of teeth 13a has coil 16 wound around it as shown in FIG. 1. The stator is completed when coils 16 are wound on stator core 13 in this fashion.

In other words, an alternating current supplied to coils 16 generates magnetic fields of N- and S-polarities alternately from the individual teeth 13a, which in turn produce an attractive force and a repulsive force with respect to magnet 15 present at the outer periphery thereof, and exert a rotational driving force on rotor 14.

Stator core 13 is fixed to wiring board 11 via housing 19, and bearing 17 is disposed to an inner periphery of housing 19. Drive shaft 18 is placed in a manner to penetrate vertically through bearing 17, and a top end of drive shaft 18 is fixed to top plate 14a of rotor 14. In this exemplary embodiment, description is provided on the understanding that one side where rotor 14 is positioned as opposed to wiring board 11 is referred to as the upper side, and the opposite side as the lower side. Taking drive shaft 18 as an example, one side of it next to rotor 14 as opposed to wiring board 11 is called the top end, and the opposite side as the bottom end. Likewise, one side of wiring board 11 facing rotor 14 is called an upper surface, and the other side as an underside surface.

In the structure described above, the alternating current is supplied to coils 16 to generate magnetic fields of N- and S-polarities alternately from the individual teeth 13a, and produce the attractive force and the repulsive force between the individual teeth 13a and magnet 15. These forces cause rotor 14 to rotate around drive shaft 18, and this force of rotation is transmitted to paper feed rollers via drive shaft 18.

According to this exemplary embodiment, to be more specific, the bottom end of drive shaft 18 penetrates a through-hole (not shown) of wiring board 11 and extends below wiring board 11. The bottom end of drive shaft 18 has a gear (not shown) attached thereto, and a gearbox (not shown) is engaged with the gear. The above mechanism hence rotates a plurality of paper feed rollers (not shown) for feeding paper. In other words, the laser printer representing the electronic apparatus of this exemplary embodiment comprises a main unit casing, a driven unit such as paper feed rollers disposed inside the main unit casing, and motor 12 coupled with the driven unit.

Also provided for use as a magnetic sensing element is Hall IC 20 mounted on wiring board 11 in a position corresponding to the bottom side of magnet 15. That is, Hall IC 20 is located on the surface of wiring board 11 in a manner to confront magnet 15. Hall IC 20 has the function of sensing magnetic poles of magnet 15 of rotor 14, as is well known, so that it senses a speed of rotation, and a detected data of the rotation is used for controlling the speed of motor 12.

Magnet 15 is so shaped that the bottom side is extended near Hall IC 20, i.e., the upper surface of wiring board 11, to keep it as close to Hall IC 20 as practically possible. The top side of magnet 15 is also extended to the same extent as the bottom side in order to avoid loosing of the balance of magnet 15 with respect to stator core 13 that can otherwise result if only the bottom side is extended.

As a result, magnet 15 has a large dimension in its vertical direction. The individual teeth 13a of stator core 13 in this exemplary embodiment are each provided with integrally-formed extended portions 32 at the peripheral end thereof to proportionate their dimensions to that of magnet 15, as shown in FIG. 1 and FIG. 2. Extended portions 32 are extended outward from the both sides of magnetic polar base 33 at the peripheral end in a direction substantially parallel to magnet 15, or in the vertical direction parallel to the longitudinal axis of drive shaft 18.

To be concrete, these extended portions 32 are formed by bending outer peripheral edges of two sheet-like plates including the upper and lower sides at outermost layers amongst a plurality of stacked sheet-like plates that constitute stator core 13, to both upward and downward in the direction substantially parallel to magnet 15.

Extended portions 32 formed in the above manner can increase their surfaces that confront vertically extended magnet 15, as shows in FIG. 1, and as a result, they can exert a large driving force on rotor 14. Extended portions 32 having such a configuration are called end plates. The effect of the end plates to collect magnetic flux can increase an amount of the magnetic flux entering the sheet-like plates of stator core 13 and exert a large driving force on rotor 14.

Stator core 13, in particular, is provided with fastening portions 34 formed in the proximity of teeth 13a at regular intervals along the circumferential direction as shown in FIG. 2. Motor 12 of this exemplary embodiment is characterized by having stator core 13 of which the individual sheet-like plates are fastened by nib-and-dimple swaging at these fastening portions 34.

Description is provided next of a detailed structure of stator core 13 in the motor of this exemplary embodiment.

Figure 3A:
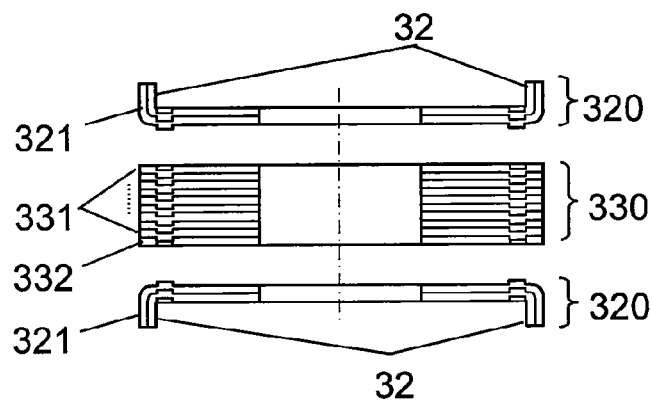
FIG. 3A is a schematic drawing showing an exemplary structure of the stator core of the motor when separated into principal components.
Figure 3B:
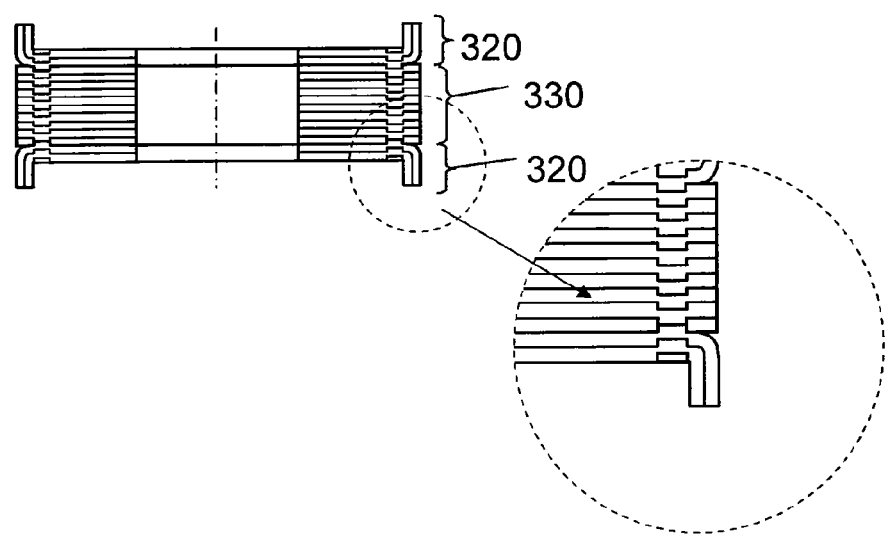
FIG. 3B is a schematic drawing showing the exemplary structure of the stator core of the motor when the principal components are assembled into one unit.

FIG. 3A is a schematic drawing showing an exemplary structure of stator core 13 when separated into some principal components, and FIG. 3B is a schematic drawing showing the exemplary structure of stator core 13 when the principal components are assembled into one unit.

As shown in FIG. 3A, stator core 13 of motor 12 of this exemplary embodiment comprises laminated part 330 formed of a plurality of sheet-like plates and two side plates 320 disposed in a manner to sandwich the both surfaces of laminated part 330. Laminated part 330 is formed by stacking a plurality of first sheet-like plates 331 and one sheet of second sheet-like plate 332 into an integral unit so that dimple portions are formed on both surfaces in the stacking direction thereof. Side plates 320 are used for the purpose of providing the function of end plates as discussed above, so that they each has extended portions 32 serving as the end plates, and nib portions are formed on one of the surfaces opposite the direction where extended portions 32 are extended.

Laminated part 330 and side plates 320 are fastened together to form stator core 13 by inserting the nib portions on side plates 320 into the dimple portions formed on laminated part 330, as shown in FIG. 3B. In other words, the dimple portions on laminated part 330 and the nib portions on side plates 320 are formed in the same positions on their surfaces in a connectible manner so that they become fastening portions 34 shown in FIG. 2 when they are fastened.

Description is provided next of further details of stator core 13.

Figure 4:
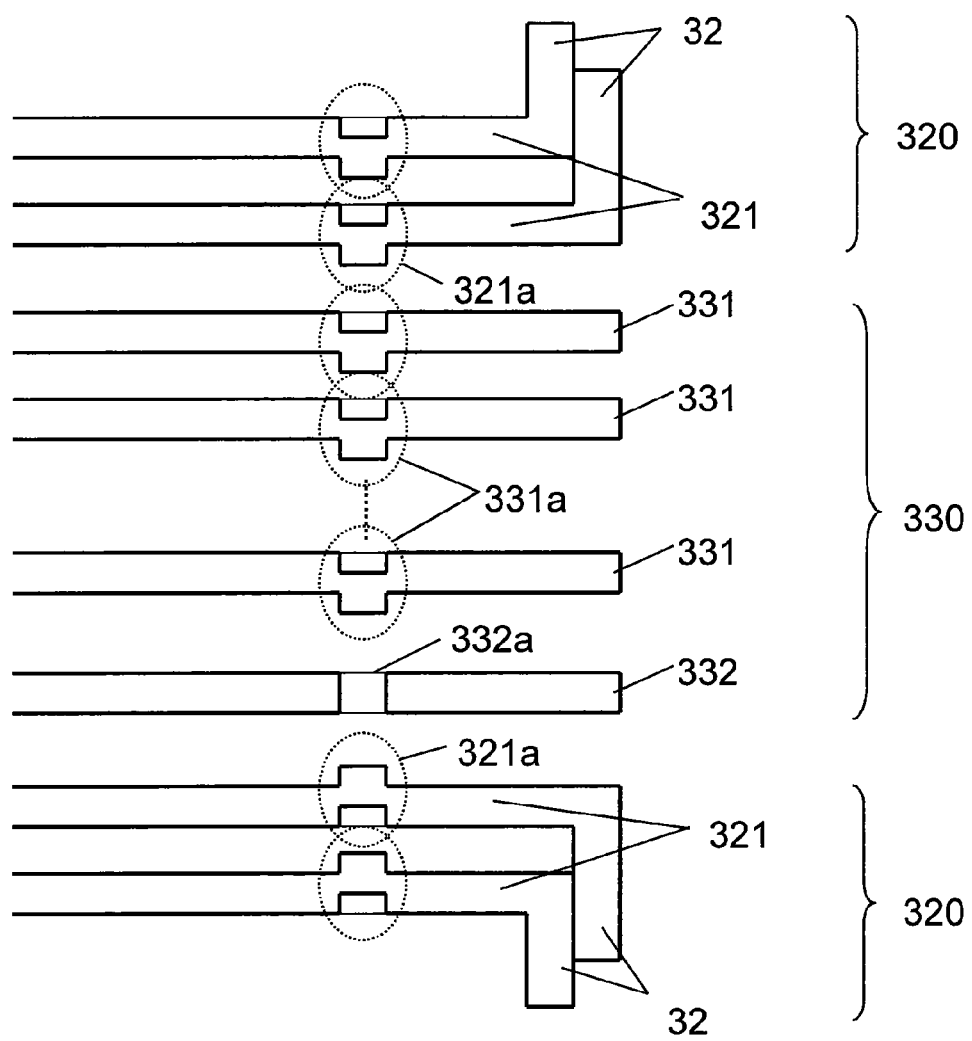
FIG. 4 is a schematic drawing showing further detail of the structure of the stator core of the motor.

FIG. 4 is a schematic drawing showing further details of the structure of stator core 13 according to this exemplary embodiment. That is, FIG. 4 shows an exemplary structure of stator core 13 when the individual sheet-like plates are separated.

As shown in FIG. 4, laminated part 330 comprises a plurality of first sheet-like plates 331 having nib-and-dimple combinations 331a, and one sheet of second sheet-like plate 332 having a shape identical in plane to that of first sheet-like plate 331 and holes 332a in the positions corresponding to nib-and-dimple combinations 331a. Nib-and-dimple combinations 331a each has a configuration consisting of a nib portion on one surface and a dimple portion produced on the other surface in the process of forming the nib portion. Sheet-like plates 331 are positioned with their dimple portions of nib-and-dimple combinations 331a facing upward and nib portions facing downward, and sheet-like plate 332 is placed under the lowermost one of sheet-like plates 331. Here, the above arrangement may be reversed so that sheet-like plates 331 are positioned with the dimple portions of nib-and-dimple combinations 331a facing downward and the nib portions facing upward, and sheet-like plate 332 is placed on top of the uppermost one of sheet-like plates 331. That is, the above arrangement of laminated part 330 leaves the dimple portions of nib-and-dimple combinations 331a on the upper surface and dimple portions of holes 332a of sheet-like plate 332 on the underside surface of laminated part 330. There are thus the dimple portions on the both surfaces of laminated part 330 in the stacking direction. Among the plurality of sheet-like plates that compose laminated part 330 of this exemplary embodiment, only one sheet of the sheet-like plate inserted there has holes 332a formed instead of nib-and-dimple combinations 331a, like second sheet-like plate 332. When laminated parts 330 are manufactured continuously in bulk, it becomes possible by virtue of the structure composed as above, that second sheet-like plates 332 can be used to separate these laminated parts 330 individually. It is also possible to manufacture laminated parts 330 of a different thickness easily by changing a set position where each of second sheet-like plates 332 is inserted into the plurality of first sheet-like plates 331.

When forming nib-and-dimple combinations 331a on sheet-like plate 331 it is suitable to design a height of the nib portions to be about half a thickness of sheet-like plate 332, or substantially one-half the thickness. In the practical purpose, it is desirable to set the height of the nib portions within a range of 40 to 60 percents of the thickness of sheet-like plate 332.

Next, each side plate 320 has a structure provided with nib portions of nib-and-dimple combinations 321a on the surface opposite the side where the extended portions 32 are extended as shown in FIG. 4. Described in the present exemplary embodiment is an example in which each of side plates 320 on both the top and the bottom sides is composed of two sheet-like plates 321. It is desirable that a height of the nib portions of nib-and-dimple combinations 321a on side plates 320 is set smaller than a depth of the dimple portions of nib-and-dimple combination 331a on sheet-like plates 331 for the reason of avoiding interference between them in the direction of their heights.

As has been described, all of the sheet-like plates that compose stator core 13 can be fastened by the nib-and-dimple swaging. Therefore, the following is one example of the methods suitable for manufacturing stator cores 13.

First, a plurality of sheet-like plates 331 and one sheet-like plate 332 are cut out from a strap metal material, for instance. Using sheet-like plate 332 as the lowermost layer, a predetermined number of sheet-like plates 331 are stacked upon it one after another while press-fitting the nib portions of nib-and-dimple combinations 331a into any of holes 332a and the dimple portions of nib-and-dimple combinations 331a on the sheet-like plate located immediately below to make the nib-and-dimple swaging. The above step completes the fabrication of laminated part 330.

On the other hand, a plurality of sheet-like plates 321 are cut out from a strap metal material in the same manner as above. Two sheets of these sheet-like plates 321 are stacked and swaged by press-fitting the nib portions of nib-and-dimple combinations 321a of the upper sheet-like plate into the dimple portions of nib-and-dimple combinations 321a on the lower sheet-like plate. Outer edge of the fastened sheet-like plates is then bent to form side plate 320. Side plates 320 for both the top and the bottom sides can be produced by using this single process since they are identical in the shape.

Following the above steps, side plates 320 are placed individually on both surfaces of laminated part 330 and they are nib-and-dimple swaged by press-fitting the nib portions of nib-and-dimple combinations 321a of side plates 320 into any of holes 332a and the dimple portions of nib-and-dimple combinations 331a on laminated part 330 to complete the fabrication of stator core 13.

As other examples of the manufacturing method of stator core 13, it is possible to fasten up all of the sheet-like plates at once by completing the nib-and-dimple swaging in a single process. In one such example, bending work is made beforehand on sheet-like plates 321 to form extended portions 32, and an assembly jig is used to hold extended portions 32. Two sheet-like plates 321, one sheet-like plate 332, a given number of sheet-like plates 331 and two sheet-like plates 321 are stacked in this order from the bottom side. All of these sheet-like plates are then pressed at once to fit the nib portions of nib-and-dimple combinations 321a of the lower one of side plate 320 into the dimple portions of nib-and-dimple combinations 321a of the upper one, the nib portions of side plate 320 into any of holes 332a and the dimple portions of nib-and-dimple combinations 331a on laminated part 330, and the nib portions of nib-and-dimple combinations 331a into any of holes 332a and the dimple portions of nib-and-dimple combinations 331a, in this order from the bottom side, to complete the fastening by the nib-and-dimple swaging. It is also possible as an alternative method to stack up all of sheet-like plates 321 in their flat shapes, and form extended portions 32 after they are fastened by the nib-and-dimple swaging.

As described, the structure of stator core 13 so composed as shown in FIG. 3 and FIG. 4 allows individual side plates 320 formed into the same shape for use to sandwich the both surfaces of laminated part 330. This can provide the advantage of using the same manufacturing process to make side plates 320, and helps improve the efficiency of production. Moreover, since stator core 13 can be formed by the single process of nib-and-dimple swaging to press-fit all of nib-and-dimple combinations 331a of the individual sheet-like plates 331 and nib-and-dimple combinations 321a of the individual sheet-like plates 321, the efficiency of production can also be improved in this process. In addition, the above structure can avoid any troubles of the sheet-like plates becoming broken and deformed thereby improving the quality since it uses the fastening method requiring only nib-and-dimple combinations 331a and 321a.

Figure 5:
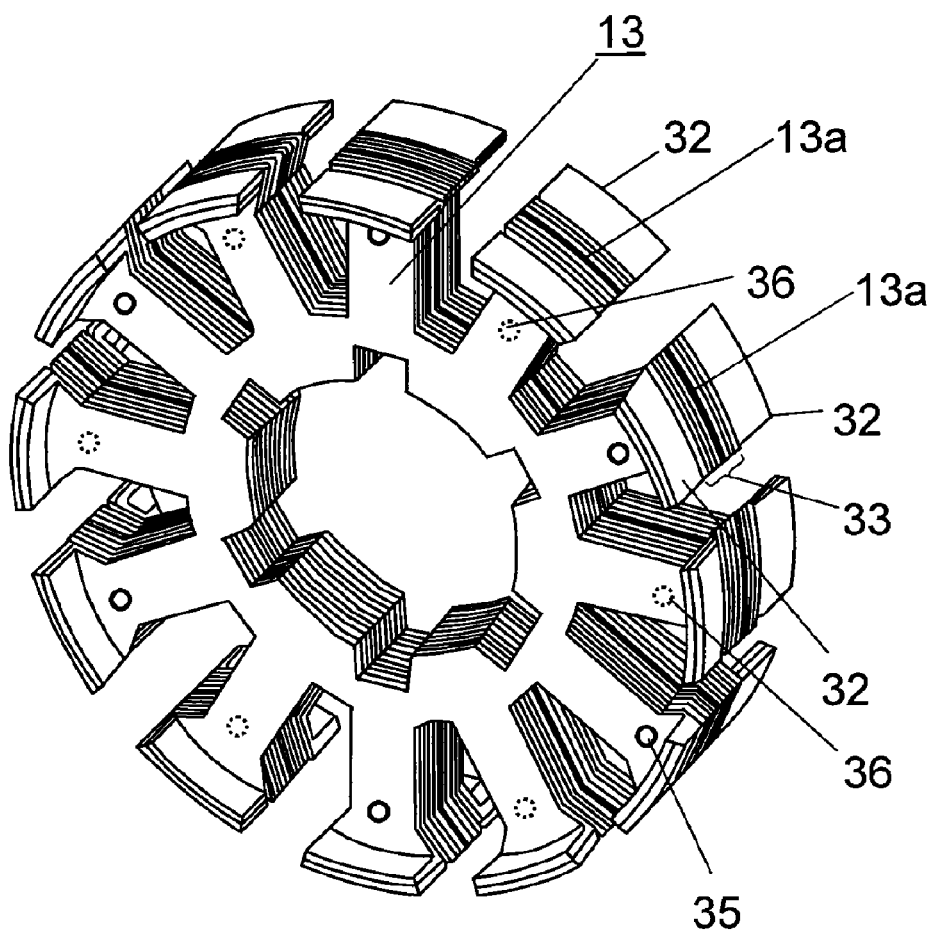
FIG. 5 is a perspective view showing another example of the stator core of the motor.
Figure 6A:
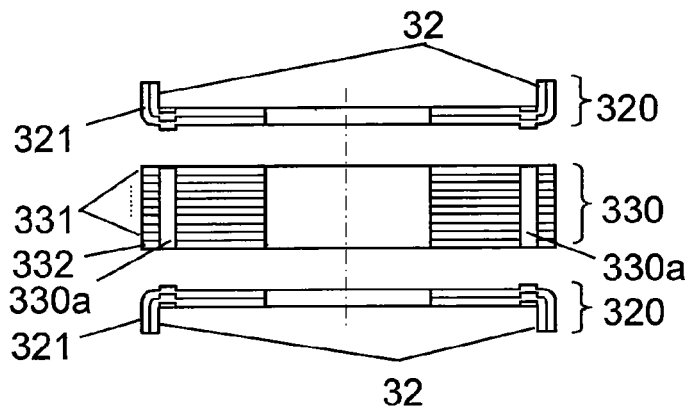
FIG. 6A is a schematic drawing showing a structure of the another example of the stator core when separated into principal components.
Figure 6B:
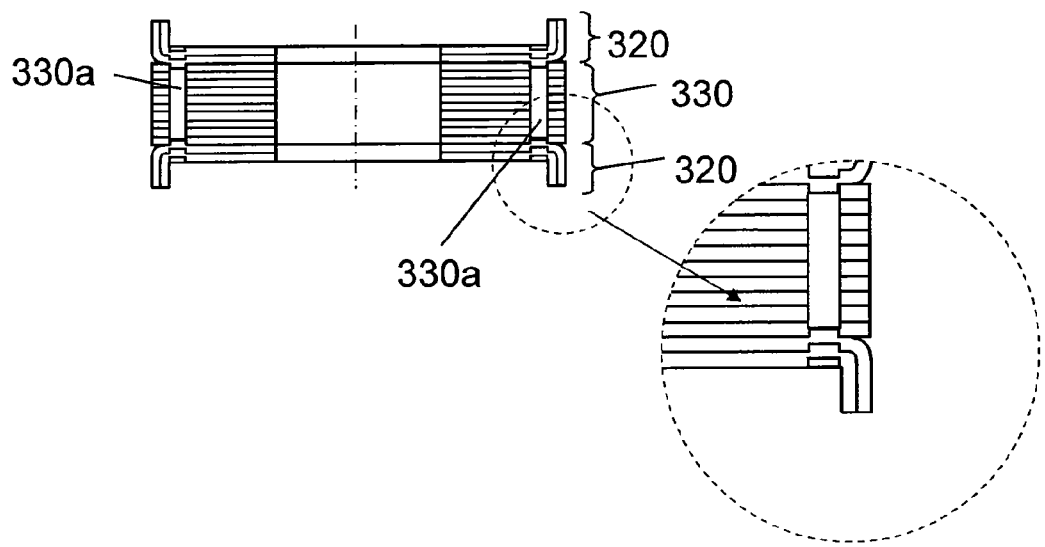
FIG. 6B is a schematic drawing showing the structure of the another example of the stator core when the principal components are assembled into one unit.

According to this exemplary embodiment, it is also possible to make some modifications on the above example of stator core 13 using the nib-and-dimple swaging method. FIG. 5 is a perspective view showing another example of the stator core. FIG. 6A and FIG. 6B are sectional views showing fastening portions for swaging side plates and a laminated part in the another example, and FIG. 7 is a schematic drawing showing further details of the structure of the another example.

As shown in FIG. 5, FIG. 6A and FIG. 6B, stator core 13 of this example is characterized by having fastening portions 35 and 36 arranged alternately at regular intervals along the circumferential direction in the proximity of teeth 13a of stator core 13, wherein fastening portions 36 are used to form laminated part 330 by stacking and swaging sheet-like plates 331, and fastening portions 35 are used to swage and fasten up side plates 320 to laminated part 330. In other words, the example shown here has different positions of fastening the individual sheet-like plates to form laminated part 330 from the positions of fastening side plates 320 to laminated part 330.

Figure 7:
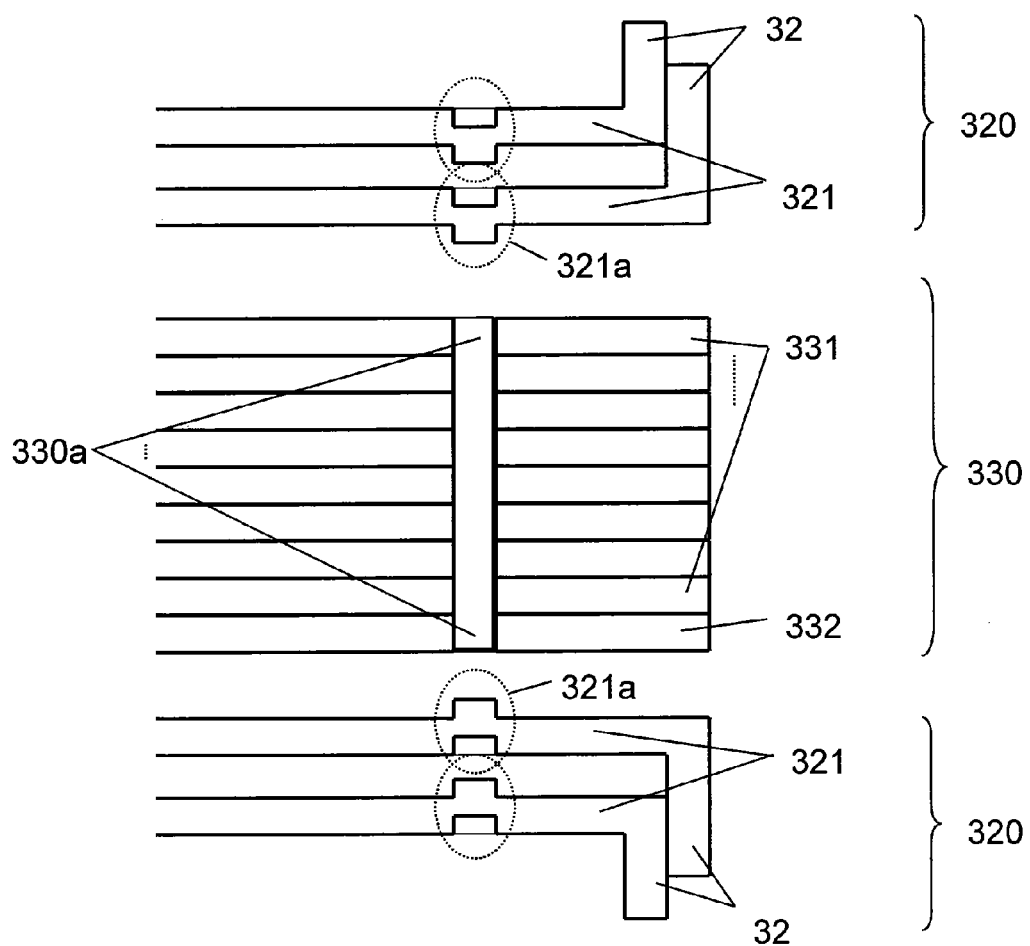
FIG. 7 is a schematic drawing showing further detail of the structure of the another example of the stator core.

For the structure of stator core 13 shown in FIG. 5, sheet-like plates 331, or first sheet-like plates, of laminated part 330 are provided with nib-and-dimple combinations 331a having nib portions and dimple portions as shown in FIG. 4, and holes 330a, or first holes, shown in FIG. 6 and FIG. 7. These nib-and-dimple combinations 331a and holes 330a are formed alternately along the circumferential direction in the proximity of teeth 13a.

Sheet-like plate 332, or second sheet-like plate, of laminated part 330 is identical in planar shape to that of sheet-like plate 331. In addition, second sheet-like plate 332 has holes 332a in the positions corresponding to nib-and-dimple combinations 331a of sheet-like plates 331 as shown in FIG. 4, and similar holes 330a in the positions corresponding to holes 330a of sheet-like plates 331 as shown in FIG. 7. That is, second sheet-like plate 332 has holes 332a and 330a defined as the second holes. Laminated part 330 of stator core 13 shown in FIG. 5 comprises a plurality of sheet-like plates 331 and one sheet-like plate 332 illustrated as above.

Stator core 13 shown in FIG. 5 is composed by inserting the individual nib portions of nib-and-dimple combinations 321a of side plates 320 into holes 330a formed on both surfaces of laminated part 330. Although FIG. 5 shows the example, in which one each of fastening portions 35 and 36 are arranged alternately, the arrangement needs not be limited to one each of them. For instance, two fastening portions 36 and one fastening portion 35, or a combination of any other numbers of them may instead be arranged alternately.

The structure composed above has through-holes formed by holes 330a of the individual sheet-like plates thereby avoiding interference of the nib portions of nib-and-dimple combinations 321a of side plates 320 with holes 330a of the individual sheet-like plates in the direction of their heights. This allows increasing of a protruding height of the nib portions of nib-and-dimple combinations 321a on side plates 320 without being restricted by the size of nib-and-dimple combinations 331a of sheet-like plates 331. It can also help increase robustness of the nib-and-dimple swaging as compared to stator core 13 shown in FIG. 2.

Description is provided hereinafter of details of stator core 13 shown in FIG. 5.

FIG. 6A is a schematic drawing showing the exemplary structure of stator core 13 shown in FIG. 5 when separated into some principal components, and FIG. 6B is another schematic drawing showing the exemplary structure of stator core 13 when the principal components are assembled into one unit. That is, both FIG. 6A and FIG. 6B are sectional views of stator core 13 of FIG. 5 showing fastening portion 35 for stacking and fastening side plates 320 and laminated part 330.

As shown in FIG. 6A, side plate 320 has extended portions 32, and nib portions formed on one of the surfaces opposite the direction where extended portions 32 are extended. Laminated part 330 is formed by stacking a plurality of first sheet-like plates 331 and one sheet of second sheet-like plate 332 into an integral unit like the one shown in FIG. 3A, and fastening them by nib-and-dimple swaging at fastening portions 36 indicated in FIG. 5. Laminated part 330 has through-holes formed by the individual holes 330a in the positions corresponding to the nib portions of side plates 320 as shown in FIG. 6A and FIG. 6B.

Laminated part 330 and side plates 320 are fastened together to form stator core 13 by inserting the nib portions of side plates 320 into the through-holes formed by holes 330a in laminated part 330, as shown in FIG. 6B. In other words, holes 330a in laminated part 330 and the nib portions of side plates 320 are formed in the same positions on their surfaces in a connectible manner so that they become fastening portions 35 shown in FIG. 5 when the nib portions of side plates 320 are press-fitted and nib-and-dimple swaged in holes 330a of laminated part 330.

FIG. 7 shows an exemplary structure of stator core 13 shown in FIG. 6A and FIG. 6B when separated into the individual sheet-like plates. As shown in FIG. 7, side plate 320 has a structure provided with the nib portions of nib-and-dimple combinations 321a on the surface opposite the direction where extended portions 32 are extended. Laminated part 330 is composed of first sheet-like plates 331 and second sheet-like plate 332, and provided with through-holes formed by the individual holes 330a in the positions corresponding to nib-and-dimple combinations 321a of side plates 320. Since the nib portions of nib-and-dimple combinations 321a of side plates 320 are press-fitted and nib-and-dimple swaged in holes 330a of laminated part 330, the protruding length of the nib portions can be increased to improve the robustness of fastening.

It becomes difficult in this structure to fabricate stator core 13 by a single process of swaging of nib-and-dimple combinations 331a of the individual sheet-like plates 331 and nib-and-dimple combinations 321a of sheet-like plate 321 since fastening portions 36 to form laminated part 330 are located independently of the positions of fastening portions 35 to fasten side plates 320 to laminated part 330. Other than the above, stator core 13 has the same advantages as the embodied example shown in FIG. 2, that side plates 320 disposed individually to sandwich the both surfaces of laminated part 330 can be formed into the same shape. This allows use of the same manufacturing process to make side plates 320, and helps improve the efficiency of production. In addition, the above structure can avoid any troubles of the sheet-like plates becoming broken and deformed since it uses the fastening method requiring only nib-and-dimple combinations 331a and 321a, thereby improving the quality.

Second Exemplary Embodiment

Figure 8:
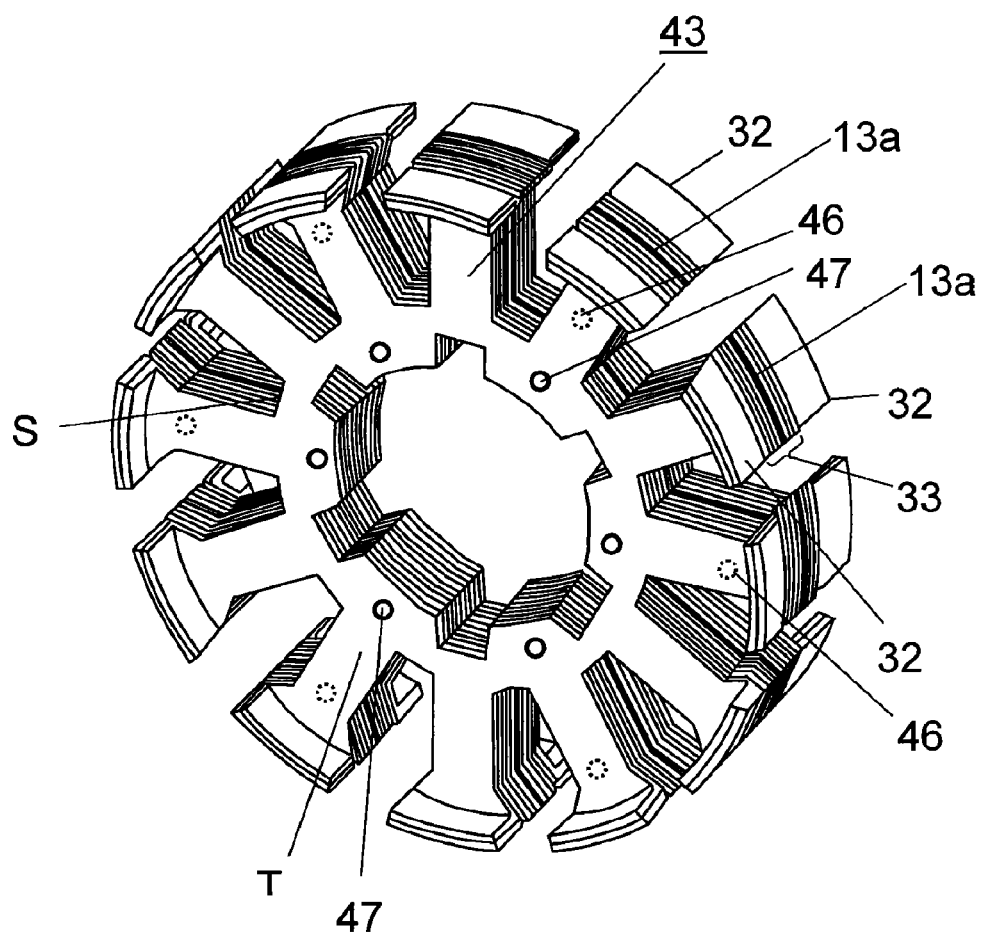
FIG. 8 is a perspective view of a stator core of a motor according to a second exemplary embodiment of the present invention.
Figure 9A:
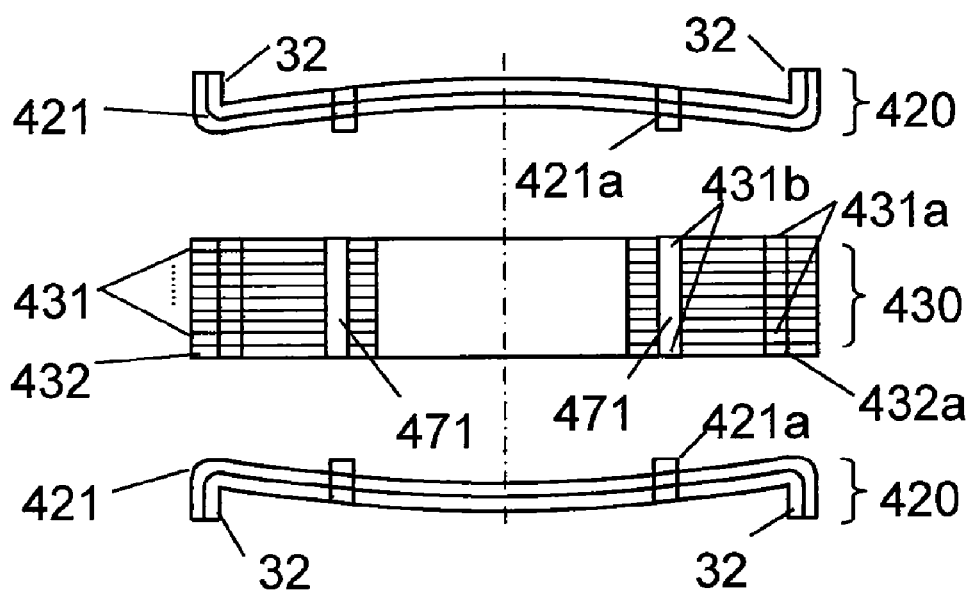
FIG. 9A is a schematic drawing showing an exemplary structure of the stator core of the motor when separated into principal components.
Figure 9B:
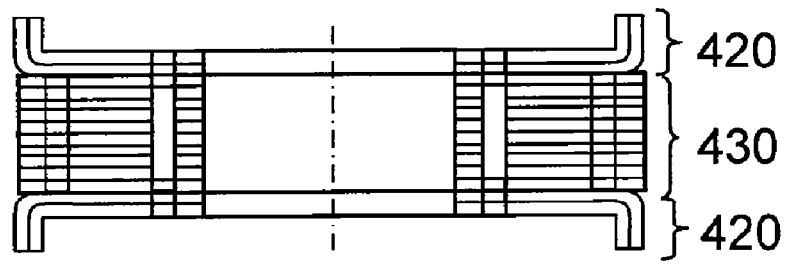
FIG. 9B is a schematic drawing showing the exemplary structure of the stator core of the motor when the principal components are assembled into one unit.

FIG. 8 is a perspective view of stator core 43 of a motor according to the second exemplary embodiment of the present invention. FIG. 9A is a schematic drawing showing an exemplary structure of stator core 43 when separated into some principal components, and FIG. 9B is another schematic drawing showing the exemplary structure of stator core 43 when the principal components are assembled into one unit. Since the motor of this exemplary embodiment is similar in general structure to that of the first exemplary embodiment, details of it will be omitted.

As shown in FIG. 8, stator core 43 of this exemplary embodiment is characterized by having fastening portions 47 for swaging a laminated part and side plates, that they are formed in positions along a circumference further inward of fastening portions 46 for the laminated part and the slit beds S of stator core 43 where coils 16 are wound.

Stator core 43 of motor 12 of this exemplary embodiment comprises laminated part 430 formed of a plurality of sheet-like plates and two side plates 420 disposed in a manner to sandwich the both surfaces of laminated part 430, as shown in FIG. 9A. Laminated part 430 is composed of a plurality of first sheet-like plates 431 having nib-and-dimple combinations 431a like those of the first exemplary embodiment, and one sheet of second sheet-like plate 432 having a shape identical in plane to that of first sheet-like plate 431 and holes 432a in the positions corresponding to nib-and-dimple combinations 431a. In addition, sheet-like plates 431 and sheet-like plate 432 that compose laminated part 430 have first holes 431b in the same positions of their surfaces. Accordingly, sheet-like plate 432 has holes 432a defined as second holes in addition to holes 431b. Since all of sheet-like plates 431 and sheet-like plate 432 have holes 431b, they form through-holes 471 when stacked together. These holes 431b are formed along circumferential positions further inward of any of nib-and-dimple combinations 431a, holes 432a and the slit beds S of stator core 43 where coils 16 are wound.

Side plates 420 have extended portions 32 and nib portions on one of the surfaces opposite the direction where extended portions 32 are extended. The nib portions on side plates 420 are provided by nib-and-dimple combinations 421a. Note that this exemplary embodiment also illustrates an example, wherein each of side plates 420 on both the top and the bottom sides is composed of two sheet-like plates 421.

As shown in FIG. 1, the magnetic flux produced by magnet 15 fixed to rotor 14 is converged by extended portions 32 of the side plates, and flows concentratively in arm portions T where coils 16 are wound, and the magnetic flux densities in arm portions T therefore increase. Through-holes if formed in these arm portions T impede the flow of magnetic flux, which causes magnetic saturation leading to a decrease in the motor efficiency. In this exemplary embodiment, therefore, holes 431b, or through-holes 471, in laminated part 430 and nib-and-dimple combinations 421a of side plates 420 corresponding to these holes 431b are formed in the positions further inward of the slit beds S of stator core 43 where coils 16 are wound. This exemplary embodiment employs the above structure so as not to impede the flow of the magnetic flux.

Laminated part 430 and side plates 420 are fastened together to form stator core 43 by inserting the nib portions of nib-and-dimple combinations 421a of side plates 420 into the dimple portions of through-holes 471 formed on laminated part 430, as shown in FIG. 9B. In other words, the dimple portions of through-holes 471 formed on laminated part 430 and the nib portions on side plates 420 are formed in the same positions on their surfaces in a connectible manner so that they become fastening portions 47 shown in FIG. 8 when they are fastened together.

As discussed, stator core 43 of this exemplary embodiment comprises laminated part 430 formed of the plurality of sheet-like plates stacked into one unit, and side plates 420 having extended portions 32 and the nib portions formed on one surface opposite the direction where extended portions 32 are extended and disposed in a manner to sandwich the both surfaces of laminated part 430. Stator core 43 is formed by inserting the nib portions of nib-and-dimple combinations 421a of side plates 420 into the dimple portions of through-holes 471 formed on laminated part 430, and by fastening laminated part 430 and side plates 420.

When compared with the first exemplary embodiment, the fastening portions between the laminated part and the side plates of this exemplary embodiment are formed in the positions further inward of those of the first exemplary embodiment. There is thus a possibility that side plates 420 warp around their edges, or parts of individual teeth 13a, to develop gaps, which give rise to a concern of decreasing the driving efficiency. In this exemplary embodiment, side plates 420 are curved in their shape as shown in FIG. 9A to prevent the possibility of such a problem. That is, side plates 420 of this exemplary embodiment are curved into such a configuration that the surface having the nib portions of nib-and-dimple combinations 421a is concaved. When fastened to through-holes 471 of laminated part 430, side plates 420 so curved as shown can increase the strength of contact between laminated part 430 and side plates 420 at the edges of stator core 43, thereby preventing gaps from developing.

With stator core 43 of the structure composed as shown in FIG. 8. FIG. 9A and FIG. 9B, side plates 420 disposed individually to sandwich the both surfaces of laminated part 430 can also be formed into the same shape. This allows use of the same manufacturing process to make side plates 420, and helps improve the efficiency of production. Furthermore, since this structure uses the method of fastening only with nib-and-dimple combinations 431a and 421a, it can avoid any troubles of the sheet-like plates becoming broken and deformed thereby improving the quality.

As illustrated, the motor of the present invention comprises a stator including a stator core having a plurality of magnetic poles disposed along the outer periphery thereof, and a rotor disposed rotatably around the outer periphery of the stator, wherein the rotor comprises a magnet disposed to the inner periphery thereof with its poles magnetized alternately to have different polarities at predetermined intervals, and each of the magnetic poles is provided with extended portions formed in a manner to extend outward from both exterior sides of a magnetic polar base in a direction substantially parallel to the magnet. The stator core comprises a laminated part made by stacking a plurality of sheet-like plates into an integral unit and provided with dimple portions formed on both surfaces in the stacking direction thereof, and side plates each having extended portions and nib portions formed on a surface opposite the side where the extended portions are provided and disposed in a manner to sandwich the both surfaces of the laminated part, wherein the laminated part and the side plates are fastened together by inserting the nib portions on the side plates into the dimple portions formed on the laminated part. In the stator core of the motor of this invention, nib-and-dimple swaging is only the process necessary to fasten all the sheet-like plates composing the laminated part and the side plates. Accordingly, the present invention can provide the motor comprising the stator core having the extended portions while also achieving improvement of the quality and efficiency in the manufacturing process.

Although the description provided above are the examples, in which any of side plates 320 and 420 on both the top and the bottom sides is composed of two sheet-like plates, it may be composed of just one sheet-like plate or any number of sheet-like plates.

INDUSTRIAL APPLICABILITY

It becomes possible according to the present invention to provide motors contrived to improve quality while increasing efficiency in the manufacturing process, thereby making the motors suitable for use in electronic apparatuses such as laser printers and laser copiers.

The invention claimed is:

1. A motor comprising:
    a stator including a stator core having a plurality of magnetic poles disposed along an outer periphery thereof; and
    a rotor disposed rotatably around the outer periphery of the stator, the rotor having a magnet disposed to an inner periphery thereof with poles magnetized alternately to have different polarities at predetermined intervals, wherein:
    each of the magnetic poles is provided with extended portions formed in a manner to extend outward from both exterior sides of a magnetic polar base in a direction substantially parallel to the magnet;
    the stator core comprises a laminated part made by stacking a plurality of sheet-like plates into an integral unit and provided with dimple portions formed on both surfaces in the stacking direction thereof, and side plates each having extended portions and nib portions formed on a surface opposite the side where the extended portions are provided and disposed in a manner to sandwich the both surfaces of the laminated part; and
    the laminated part comprises a plurality of first sheet-like plates provided with nib-and-dimple combinations having nib portions on one surface and dimple portions produced on the other surface in the process of forming the nib portions, and one sheet of second sheet-like plate of a shape identical to that of the first sheet-like plate and having only holes in positions corresponding to the nib-and-dimple combinations; and
    the laminated part and the side plates are fastened together by inserting the nib portions on the side plates into the dimple portions formed on the laminated part.

2. The motor of claim 1, wherein the side plates disposed individually to sandwich the both surfaces of the laminated part have the same shape.

3. The motor of claim 2, wherein the nib portions have a protruding height of generally one-half a thickness of the sheet-like plate.

4. An electronic apparatus comprising a main unit casing, a driven unit disposed inside the main unit casing, and a motor of claim 2 coupled with the driven unit.

5. The motor of claim 1, wherein:
    each of the side plates is formed of at least one sheet of sheet-like plate having the extended portions and nib-and-dimple combinations, and
    further wherein the nib portions of one of the side plates are inserted in the dimple portions on the first sheet-like plate on one surface of the laminated part, and the nib portions of the other side plate are inserted in dimple portions formed by the holes of the second sheet-like plate on the other surface of the laminated part.

6. The motor of claim 5, wherein the nib portions have a protruding height of generally one-half a thickness of the sheet-like plate.

7. An electronic apparatus comprising a main unit casing, a driven unit disposed inside the main unit casing, and a motor of claim 5 coupled with the driven unit.

8. The motor of claim 1, wherein the laminated part comprises:
    a plurality of first sheet-like plates provided with nib-and-dimple combinations having nib portions on one surface and dimple portions produced on the other surface in the process of forming the nib portions, and first holes, wherein the nib-and-dimple combinations and the first holes are arranged alternately along the circumferential direction thereof; and one sheet of second sheet-like plate of a shape identical to that of the first sheet-like plate and having second holes in positions corresponding to the nib-and-dimple combinations and the first holes, further wherein each of the side plates is formed of at least one sheet of sheet-like plate having the extended portions and nib-and-dimple combinations, and the nib portions of the side plates are inserted individually in the first holes formed on the first sheet-like plate and the second holes formed on the second sheet-like plate of the laminated part.

9. The motor of claim 8, wherein the nib portions have a protruding height of generally one-half a thickness of the sheet-like plate.

10. An electronic apparatus comprising a main unit casing, a driven unit disposed inside the main unit casing, and a motor of claim 8 coupled with the driven unit.

11. The motor of claim 1, wherein the laminated part comprises:

a plurality of first sheet-like plates provided with nib-and-dimple combinations having nib portions on one surface and dimple portions produced on the other surface in the process of forming the nib portions, and first holes formed along circumferential positions inward of the nib-and-dimple combinations; and one sheet of second sheet-like plate of a shape identical to that of the first sheet-like plate and having second holes in positions corresponding to the nib-and-dimple combinations and the first holes, further wherein each of the side plates is formed of at least one sheet of sheet-like plate having the extended portions and nib-and-dimple combinations, and the nib portions of the side plates are inserted individually in the first holes formed on the first sheet-like plate of the laminated part and the second holes formed on the second sheet-like plate in the positions corresponding to the first holes.

12. The motor of claim 11, wherein the first holes are formed along circumferential positions further inward of a slit bed of the stator core where a coil is wound.

13. The motor of claim 12, wherein the side plate is curved forming a concave surface, and the nib portions on the concave surface are inserted in the holes of the laminated part.

14. The motor of claim 13, wherein the nib portions have a protruding height of generally one-half a thickness of the sheet-like plate.

15. An electronic apparatus comprising a main unit casing, a driven unit disposed inside the main unit casing, and a motor of claim 13 coupled with the driven unit.

16. The motor of claim 12, wherein the nib portions have a protruding height of generally one-half a thickness of the sheet-like plate.

17. An electronic apparatus comprising a main unit casing, a driven unit disposed inside the main unit casing, and a motor of claim 12 coupled with the driven unit.

18. The motor of claim 11, wherein the side plate is curved forming a concave surface, and the nib portions on the concave surface are inserted in the holes of the laminated part.

19. The motor of claim 18, wherein the nib portions have a protruding height of generally one-half a thickness of the sheet-like plate.

20. An electronic apparatus comprising a main unit casing, a driven unit disposed inside the main unit casing, and a motor of claim 18 coupled with the driven unit.

21. The motor of claim 11, wherein the nib portions have a protruding height of generally one-half a thickness of the sheet-like plate.

22. An electronic apparatus comprising a main unit casing, a driven unit disposed inside the main unit casing, and a motor of claim 11 coupled with the driven unit.

23. The motor of claim 1, wherein the nib portions have a protruding height of generally one-half a thickness of the sheet-like plate.

24. An electronic apparatus comprising a main unit casing, a driven unit disposed inside the main unit casing, and a motor of claim 1 coupled with the driven unit.

* * * * *